US012640063B2

(12) United States Patent
Albu

(10) Patent No.: US 12,640,063 B2
(45) Date of Patent: May 26, 2026

(54) DISPLAY DEVICE

(71) Applicant: Veaceslav Albu, Chisinau (MD)

(72) Inventor: Veaceslav Albu, Chisinau (MD)

( * ) Notice: Subject to any disclaimer, the term of this patent is extended or adjusted under 35 U.S.C. 154(b) by 66 days.

(21) Appl. No.: 18/035,108

(22) PCT Filed: Nov. 12, 2021

(86) PCT No.: PCT/MD2021/000002
§ 371 (c)(1),
(2) Date: May 3, 2023

(87) PCT Pub. No.: WO2022/103248
PCT Pub. Date: May 19, 2022

(65) Prior Publication Data

US 2024/0013686 A1 Jan. 11, 2024

(30) Foreign Application Priority Data

Nov. 13, 2020 (MD) ........................ MDS 2020 0143

(51) Int. Cl.
*G09F 13/04* (2006.01)
*G09F 27/00* (2006.01)

(52) U.S. Cl.
CPC ...... *G09F 13/0431* (2021.05); *G09F 13/0404* (2013.01); *G09F 13/0445* (2021.05); *G09F 27/00* (2013.01)

(58) Field of Classification Search
CPC ............. G09F 13/0431; G09F 13/0404; G09F 13/0445; G09F 27/00; G09F 11/02; G09F 15/00
See application file for complete search history.

(56) References Cited

U.S. PATENT DOCUMENTS 1,288,745 A * 12/1918 Teitz ........................ G09F 11/02 40/506
2,727,426 A * 12/1955 Lopez ...................... G09F 27/00 40/473
3,289,322 A * 12/1966 Patrick ................... G09B 23/26 446/107
3,320,691 A * 5/1967 Harmon .................. A47F 5/025 384/612
3,658,413 A * 4/1972 Cornell ................ G02B 27/022 40/720
3,665,625 A * 5/1972 Moss ..................... F04D 19/002 40/473
3,774,332 A * 11/1973 Schneider ................. G09F 1/12 D11/131
(Continued)

FOREIGN PATENT DOCUMENTS

KR 102552994 B1 * 7/2023 ............. F16H 57/02

*Primary Examiner* — Cassandra Davis

(57) ABSTRACT

A display device comprising a base (1) with a rotation drive mechanism (2), a drive shaft with an axially movable rod (6) and a three-dimensional display body (8) in the form of a regular polyhedron The demonstration body (8) is rigidly fixed to the rod (6) and rotates to sequentially display content on its faces The device can be used in both ground-mounted and suspended configurations. The demonstration body includes removable display plates (11) and reinforcing elements (10) with integrated light and sound sources, enabling dynamic content visualization.

12 Claims, 5 Drawing Sheets

(56) References Cited

U.S. PATENT DOCUMENTS

| | | | | | |
|---|---|---|---|---|---|
| 4,071,968 | A * | 2/1978 | Polizzi | G09F 19/02 | 40/473 |
| 5,309,657 | A * | 5/1994 | Spencer | G09F 1/12 | 40/473 |
| 5,367,808 | A * | 11/1994 | Liebman | G09F 19/02 | 40/473 |
| 6,571,495 | B1 * | 6/2003 | Margaronis | G09F 15/0087 | 40/493 |
| 2011/0239500 | A1 * | 10/2011 | Gatuslao | F16H 1/10 | 40/473 |
| 2013/0298432 | A1 * | 11/2013 | Gatuslao | G09F 15/0087 | 40/473 |

* cited by examiner

DISPLAY DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

(1) Field of the Invention

The invention relates to display devices designed to exhibit fine and audiovisual art, advertising and information materials, and decorative elements. The device can function as an independent object or as part of contemporary art installations, advertising, interior or exterior design, landscape architecture, and souvenir or jewelry design.

(2) Description of Related Art Including Information Disclosed Under 37 CFR 1.97 and 1.98

The following references are cited as prior art:

[1] U.S. Pat. No. 4,071,968 (1978)

[2] German Patent Application No. DE 20 2007 004 038 U1 (2007)

A mobile demonstration device [1] consists of sequences of solid geometric shapes, polygons, connected to each other universal joints, in such a way that one polygonal movement is transferred to the others. Polygons can be tetrahedra or other tetrahedral geometric elements, triangular faces of which enclose sides of an unequal proportion.

The disadvantage of this solution is that the initial display on the faces of the tetrahedra is fragmented and the concept of the promotional image only appears when all the elements are in the same plane, but nevertheless are seen fragmented on the triangular surfaces of the tetrahedra.

Another device [2] with an advertising surface in the form of a cube contains a guideway along which the cube goes up and down simultaneously rotating around a vertical axis.

The disadvantage of this solution is that only four out of six faces display advertising content.

The main disadvantage of the known devices is the use of simple planar fragmented display surfaces for presenting information and limited functionality.

The technical problem solved by the present invention by providing a device with improved visualization and mobility. Present three-dimensional displays offer a more engaging and informative presentation due to the complexity and functionality of a multi-faceted demonstration body with enhanced stability and visualization capabilities.

BRIEF SUMMARY OF THE INVENTION

The invention provides a device a base with a rotation drive mechanism, a drive shaft with an axially movable rod and a three-dimensional demonstration body in the form of a regular polyhedron. The demonstration body includes a spatial frame with attached plates and reinforcing elements, enhancing its structural integrity and visual impact. The demonstration body is rigidly fixed to the rod and rotates to sequentially display content on its faces.

The invention addresses limitations in existing displays by offering improved stability, dynamic interaction, and versatility expressed in the fact that the device can be used in both ground-mounted and suspended configuration.

DETAILED DESCRIPTION OF THE INVENTION

Figure 1:
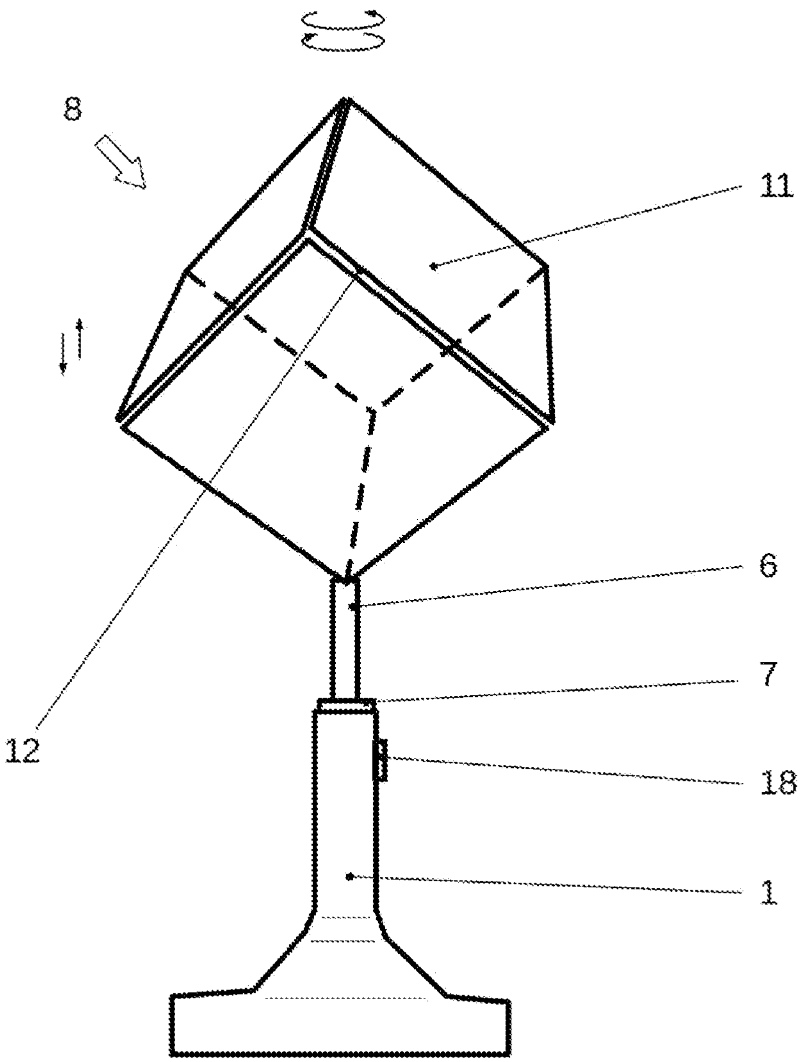
FIG. 1: general isometric view of the device with a cube-shaped display body.
Figure 2:
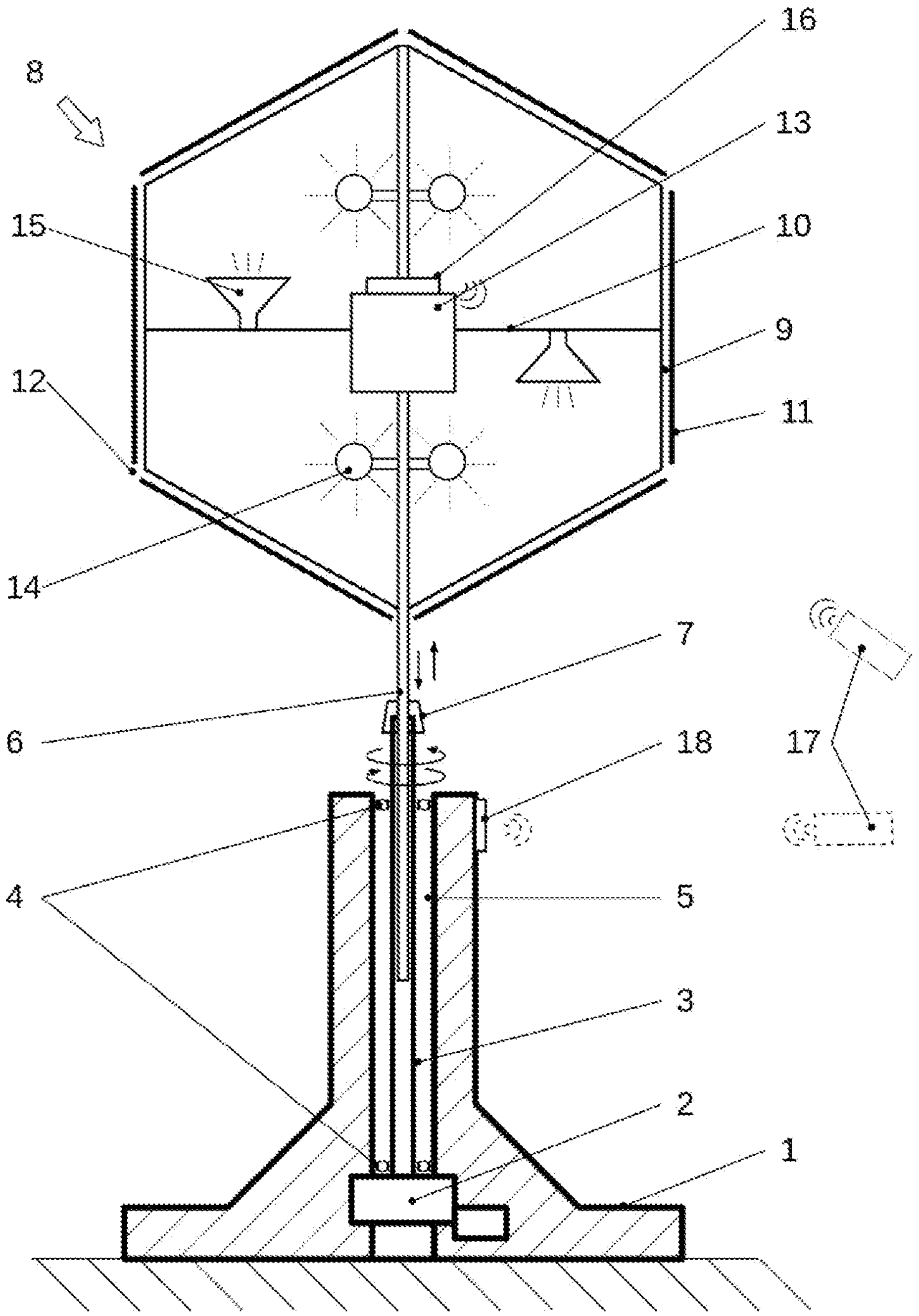
FIG. 2: schematic view of the device in a ground-mounted position.
Figure 3:
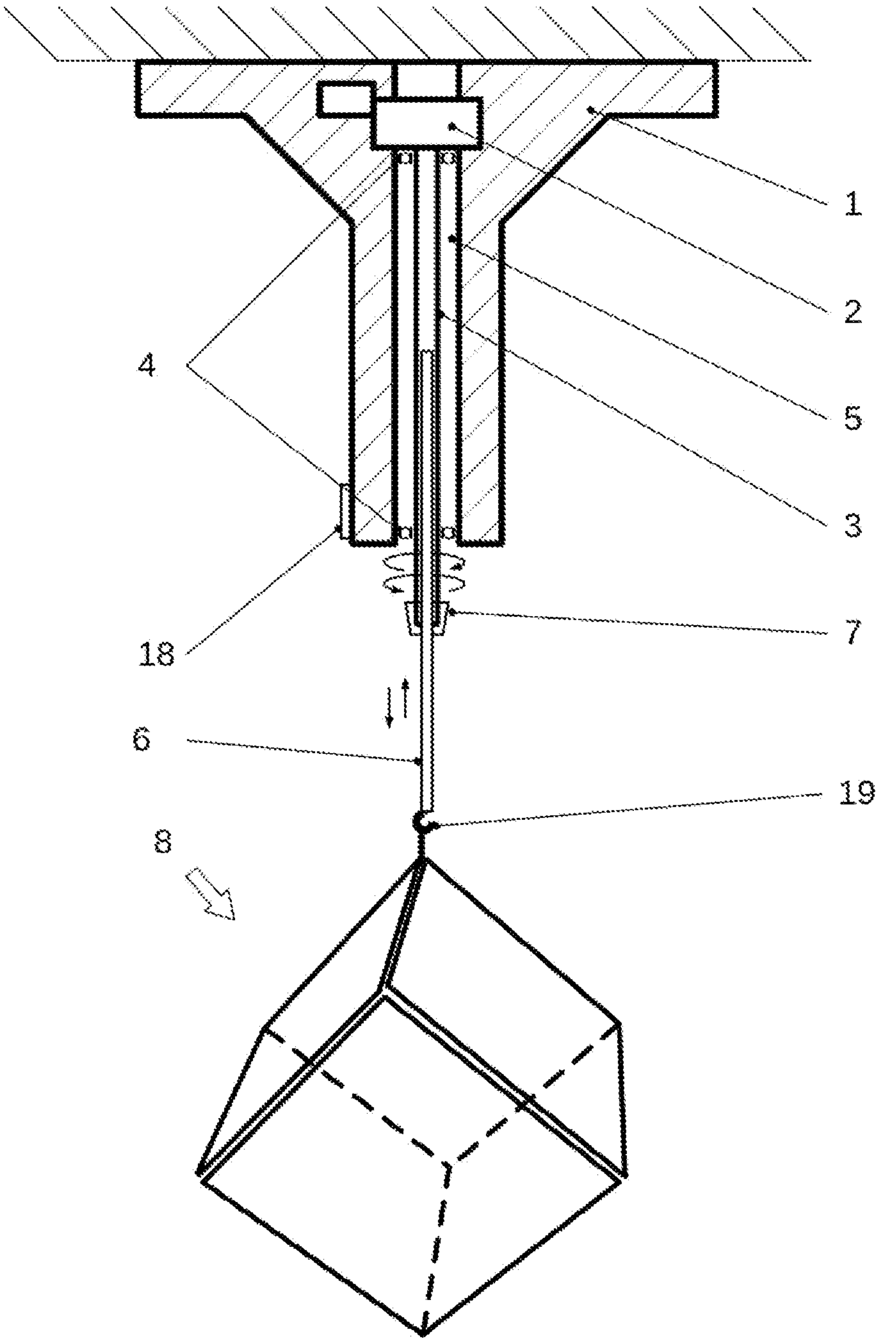
FIG. 3: schematic view of the device in a suspended position.
Figure 4:
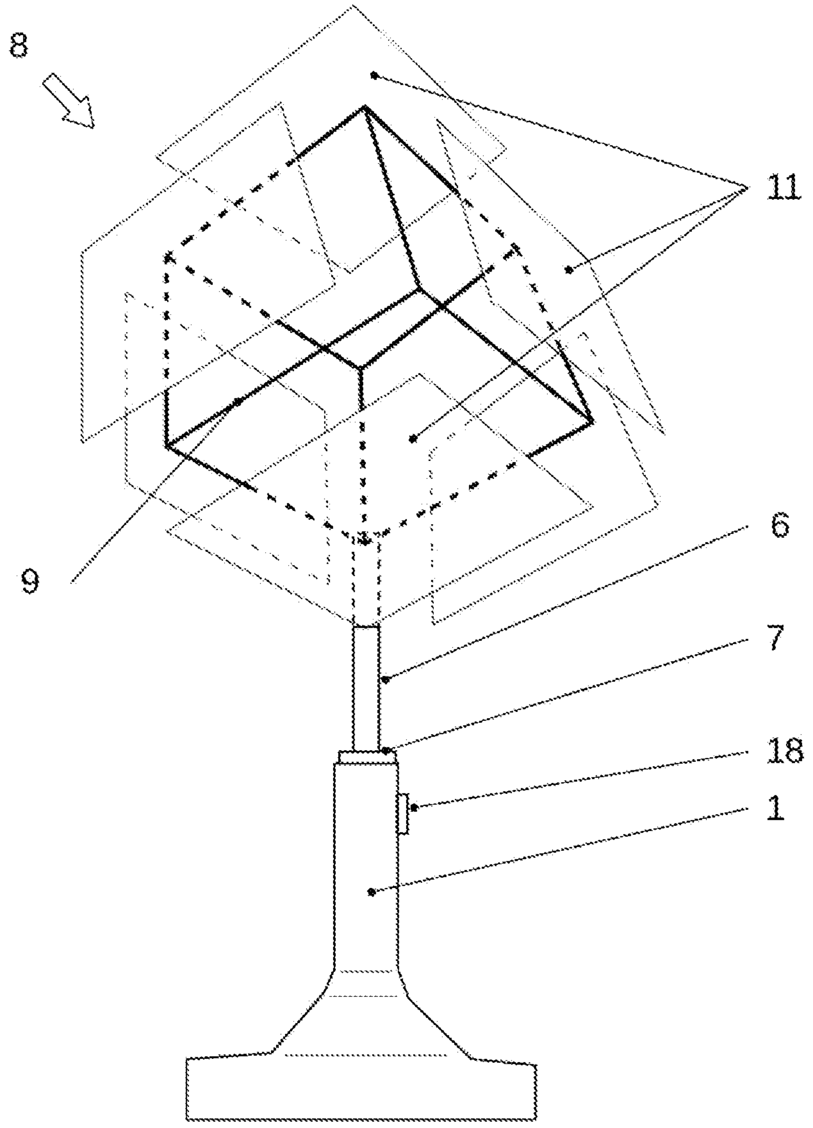
FIG. 4: isometric view of the device with separated display plates.
Figure 5:
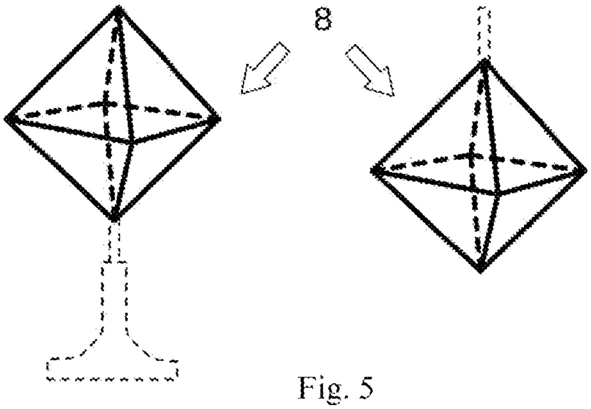
FIG. 5: schematic view of the device with a cube display body in ground-mounted and suspended positions.
Figure 6:
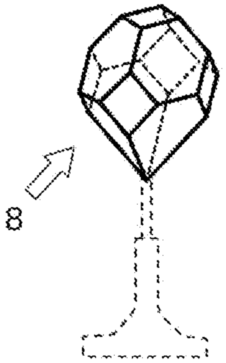
FIG. 6: schematic view of the device with a truncated octahedral display body in a ground-mounted position.
Figure 7:
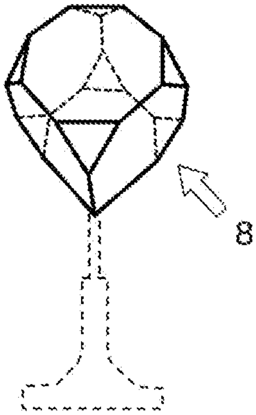
FIG. 7: schematic view of the device with a truncated cube display body in a ground-mounted position.
Figure 8:
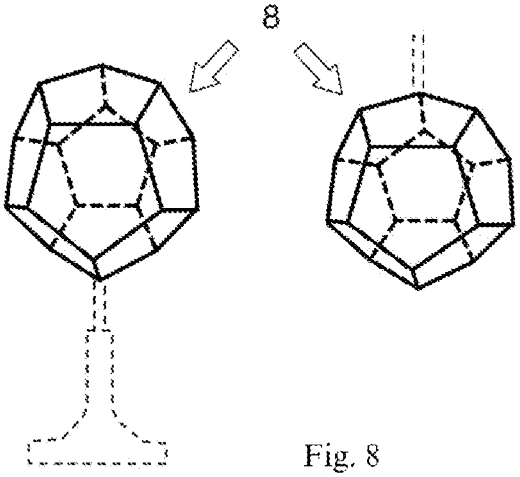
FIG. 8: schematic view of the device with a dodecahedron display body in ground-mounted and suspended positions.
Figure 9:
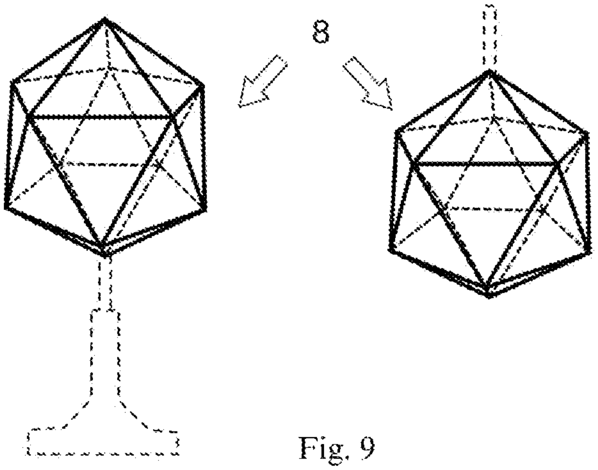
FIG. 9: schematic view of the device with an icosahedron display body in the ground-mounted and suspended positions.

The display device (FIGS. 1-9) comprises a base (1) with a rotation drive mechanism (2) connected to a power source. A hollow drive shaft (3) is mounted on bearings (4) within the base (1). A rod (6) is axially movable, within the drive shaft (3) and can be fixed using a lock (7). A three-dimensional demonstration body (8), such as a cube, is rigidly fixed to the rod (6), at one of its vertices. The demonstration body (8) comprises an inner frame (9) with reinforcing elements (10) and removable display plates (11) attached to the frame. The device includes light sources (14), sound sources (15) and a programmable receiver-actuator (16) controlled by a remote transmitter (17). A receiver-actuator (18) programmed commands for the rotation drive mechanism (2) Receiver-actuators (16) and (18), and a remote transmitter (17) can use any currently known data transfer technologies (infrared, BLUETOOTH® WIFI®, 4G™ or 5G™). Receiver-actuator (16) is programmable, equipped with a microprocessor and USB™ connector interfaces. The device operates by rotating the demonstration body (8) to sequentially display content on its faces.

The invention claimed is:

1. A display device comprising:

a base (1) with a rotation drive mechanism (2);

a drive shaft (3) with a rod (6) configured for axial movement relative to the drive shaft (3), wherein the rod (6) is fixable to the drive shaft (3) using a lock (7);

a three-dimensional demonstration body (8) in the form of a regular polyhedron, rigidly fixed to the rod (6) at one of its vertices and oriented along its diagonal wherein the demonstration body (8) is rotatable with the rod (6);

a plurality of display plates (11), removably attached to a spatial frame (9), within the demonstration body (8), wherein the spatial frame (9) includes reinforcing elements (10).

2. The display device of claim 1 wherein the demonstration body (8) is suspended from the rod (6) by a suspension device (19) and is rotatable with the rod (6).

3. The display device of claim 1 or 2, wherein the demonstration body (8) is selected from the group consisting of a cube, a truncated cube, an octahedron, a truncated octahedron, a dodecahedron, er and an icosahedron.

4. The display device of claim 1, wherein the reinforcing elements (10) include light sources (14) and sound sources (15) powered by an independent current source (13) and controlled by a programmable device (16).

5. The display device of claim 2, wherein the reinforcing elements (10) include light sources (14) and sound sources (15) powered by an independent current source (13) and controlled by a programmable device (16).

6. The display device of claim 3, wherein the reinforcing elements (10) include light sources (14) and sound sources (15) powered by an independent current source (13) and controlled by a programmable device (16).

7. The display device of claim 1, wherein the display plates (11) include content selected from the group consisting of paintings, engravings, bas-reliefs, promotional materials, decorative glass, ornaments, mirrors, active LED panels, and TV panels.

8. The display device of claim 2, wherein the display plates (11) include content selected from the group consisting of paintings, engravings, bas-reliefs, promotional materials, decorative glass, ornaments, mirrors, active LED panels, and TV panels.

9. The display device of claim 3, wherein the display plates (11) include content selected from the group consisting of paintings, engravings, bas-reliefs, promotional materials, decorative glass, ornaments, mirrors, active LED panels, and TV panels.

10. The device referred to by claim 1, wherein the contents of the plates each display plate (11) includes one or more display elements selected from the group consisting of paintings, engravings, bas-reliefs, promotional materials, decorative glass, ornaments, mirrors, active LED panels, and TV panels, and wherein the display elements incorporated on the plurality of display plates (11) represent either a unified thematic concept or a combination of distinct thematic concepts.

11. The device referred to by claim 2, wherein the contents of the plates each display plate (11) includes one or more display elements selected from the group consisting of paintings, engravings, bas-reliefs, promotional materials, decorative glass, ornaments, mirrors, active LED panels, and TV panels, and wherein the display elements incorporated on the plurality of display plates (11) represent either a unified thematic concept or a combination of distinct thematic concepts.

12. The device referred to by claim 3, wherein the contents of the plates each display plate (11) includes one or more display elements selected from the group consisting of paintings, engravings, bas-reliefs, promotional materials, decorative glass, ornaments, mirrors, active LED panels, and TV panels, and wherein the display elements incorporated on the plurality of display plates (11) represent either a unified thematic concept or a combination of distinct thematic concepts.

* * * * *